Figure 1:
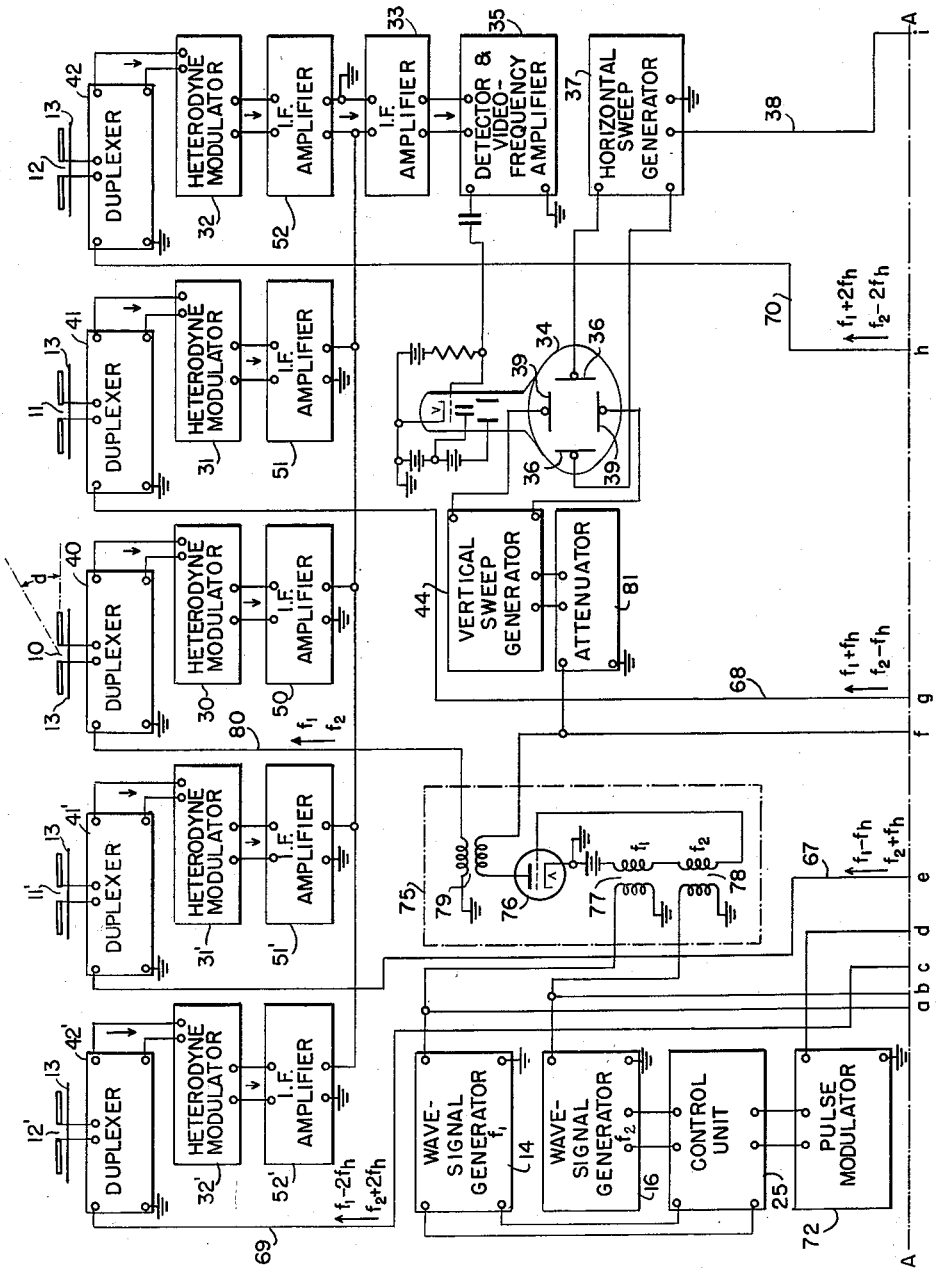

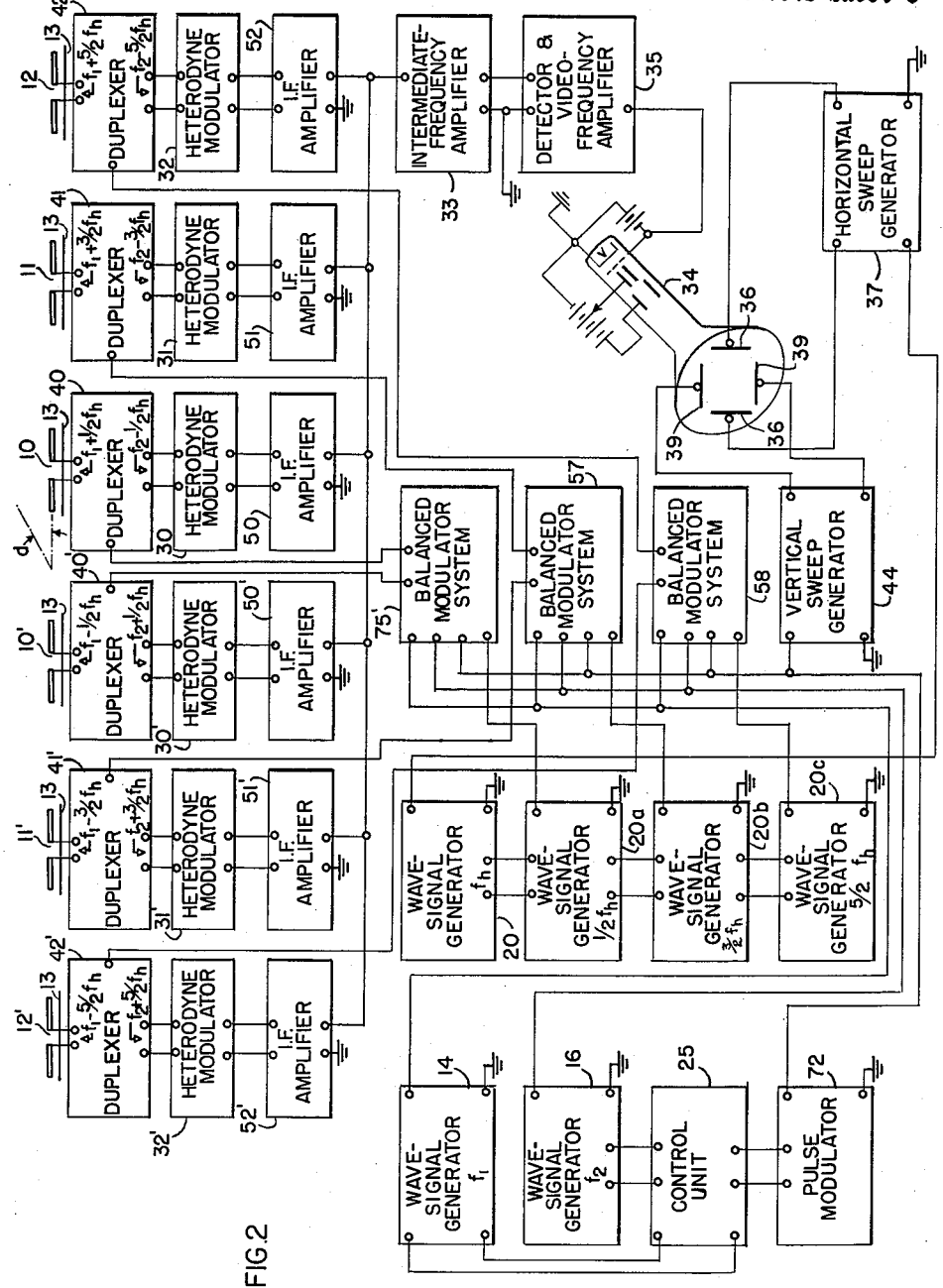

United States Patent Office 2,982,957
Patented May 2, 1961

2,982,957

SYSTEM FOR LOCATING A RADIANT-SIGNAL REFLECTOR

Harold M. Lewis, Allenhurst, N.J., assignor to Hazeltine Research, Inc., Chicago, Ill., a corporation of Illinois Filed Mar. 26, 1948, Ser. No. 17,294

13 Claims. (Cl. 343—11)

This invention relates to systems for locating a radiant-signal reflector. More particularly, the invention is directed to systems for scanning a predetermined space with a sharply concentrated radiant-signal beam and for receiving and utilizing the radiant-signal energy of the beam reflected by a reflector, such as an aircraft, in the path of the beam to provide an indication of the distance and the direction of the reflector from the system.

Aircraft-locating systems heretofore employed have scanned a predetermined space in either one or two directions with a concentrated radiant beam of wave signals and have utilized the reflected wave-signal energy received from an aircraft in the path of the beam to produce an indication representative of the distance and the direction of the aircraft from the locating system. Certain prior such systems have accomplished this by the use of a radiant-signal translating system having a radiating characteristic in the form of a concentrated beam, the translating system being physically rotated by suitable mechanical apparatus to effect the scanning action. In order to produce the required movement of the translating system, this mechanical apparatus necessarily is relatively complex in character and, hence, expensive to construct. Furthermore, considerable energy is required to rotate the translating system.

Other prior locating systems have effected electrically the movement of the radiant beam to produce the desired scanning action, thus avoiding the above-mentioned disadvantages inherent in systems wherein the movement of the scanning beam is produced mechanically. One such type of locating system utilizes one or more arrays of physically spaced radiant-signal translators which are coupled to a common wave-signal translating channel through individual phase-shifting devices and energized from an end one of the translators by wave-signal energy of changing frequency. A system of this type forms the subject matter of United States Letters Patent No. 2,407,169, granted September 3, 1946, to Arthur V. Loughren, entitled "System For Locating Radiated-Signal Reflectors," and assigned to the same assignee as the present invention.

Another prior such locating system wherein scanning by the radiant-signal beam is accomplished electrically has employed a carrier-frequency wave-signal generator, one or more wave-signal generators which determine the scanning frequency of the radiant beam, a heterodyne oscillator, and numerous band-pass selectors, modulators, and amplifiers for developing wave signals of the proper frequency for application to and radiation by individual ones of a plurality of spaced wave-signal translators. Generally similar units are also employed in the receiver portion of this locating system in order to utilize the reflected wave-signal energy to provide an indication of the presence in the scanned area of a wave-signal reflector such as an aircraft. Systems of the type just mentioned form the subject matter of applicant's United States Letters Patent No. 2,426,460, granted August 26, 1947, entitled "System For Locating a Radiated-Signal Reflector"; United States Letters Patent No. 2,429,726, granted October 28, 1947, entitled "System For Space-Scanning With a Radiated Wave-Signal Beam"; and United States Letters Patent No. 2,430,296, granted November 4, 1947, entitled "Radiated-Signal Receiving System," all assigned to the same assignee as the present invention. Since a relatively large number of circuit elements and units are ordinarily used in a locating system of the type just referred to, the system may be somewhat complex for certain applications. A locating system of the type disclosed in applicant's above-identified patents is particularly suited for rapid angular scanning. In a particular application, however, it may be desired that the scanning be accomplished at a relatively slow rate. In such event, the frequencies selected by the band-pass selectors are more closely spaced and the selectors are then designed and adjusted with somewhat greater care. It may also be desirable to alter over a wide range of values the rate at which the scanning operation preceeds from time to time. Systems of the type last described involve readjustments of numerous band-pass selectors to accommodate such changes of scanning rate over a wide range and may thus limit somewhat the rapidity with which large changes of scanning rate may be accomplished.

It is an object of the invention, therefore, to provide a new and improved system for effecting electrical scanning to locate a radiant-signal reflector.

It is another object of the invention to provide a new and improved system for locating a radiant-signal reflector, which scans a predetermined space entirely by electrical means yet is relatively simple in construction.

It is a further object of the invention to provide a new and improved system for locating a radiant-signal reflector which requires the use of only a very limited number of wave-signal selectors.

It is yet another object of the invention to provide a new and improved locating system which is particularly suited for operation with pulse modulation.

It is another object of the invention to provide a new and improved system for locating a wave-signal reflector which utilizes the same radiant-signal translators for both transmitting and receiving wave-signal energy.

It is an additional object of the invention to provide a new and improved system for scanning a predetermined space with a pulse-modulated radiant-signal beam.

In accordance with one form of the invention, a system for scanning a predetermined space with a radiant-signal beam comprises a plurality of spaced signal radiators, means for providing two carrier-frequency wave signals having a substantially quadrature phase relationship, and means for providing two signals having a substantially quadrature phase relationship and having a frequency related to the desired frequency of scanning of the space by the radiant-signal beam. The system also includes modulator means responsive to the above-mentioned wave signals and signals for deriving at least two wave-signal modulation components of different frequencies whereby the system angularly scans the predetermined space with the radiant-signal beam.

Also in accordance with the invention, a system for locating a radiant-signal reflector by scanning a predetermined space during alternate or transmitting intervals with a pulse-modulated beam includes the scanning system just mentioned and a wave-signal receiver including a plurality of heterodyne modulators coupled to individual ones of the plurality of spaced radiators or translators. The modulator means of the locating system is effective to derive and to apply to the heterodyne modulators during intervening or receiving intervals individual ones of a plurality of wave-signal modulation components of individual frequencies different from each other and from the components mentioned in the preceding paragraph.

This is to enable the locating system angularly to scan the aforesaid predetermined space with a pulse-modulated radiant-signal beam and radiant-signal energy of the beam reflected by any radiant-signal reflector in the predetermined space to the translators produces in the heterodyne modulators modulation components having additive phase only for one direction of reception by the translators, which direction scans the predetermined space effectively in synchronism with the radiant-signal beam. The locating system further includes means for utilizing the above-mentioned additive-phase modulation components to provide an indication of at least the direction of the reflector with respect to the system.

For a better understanding of the present invention, together with other and further objects thereof, reference is had to the following description taken in connection with the accompanying drawings, and its scope will be pointed out in the appended claims.

Figure 1A:
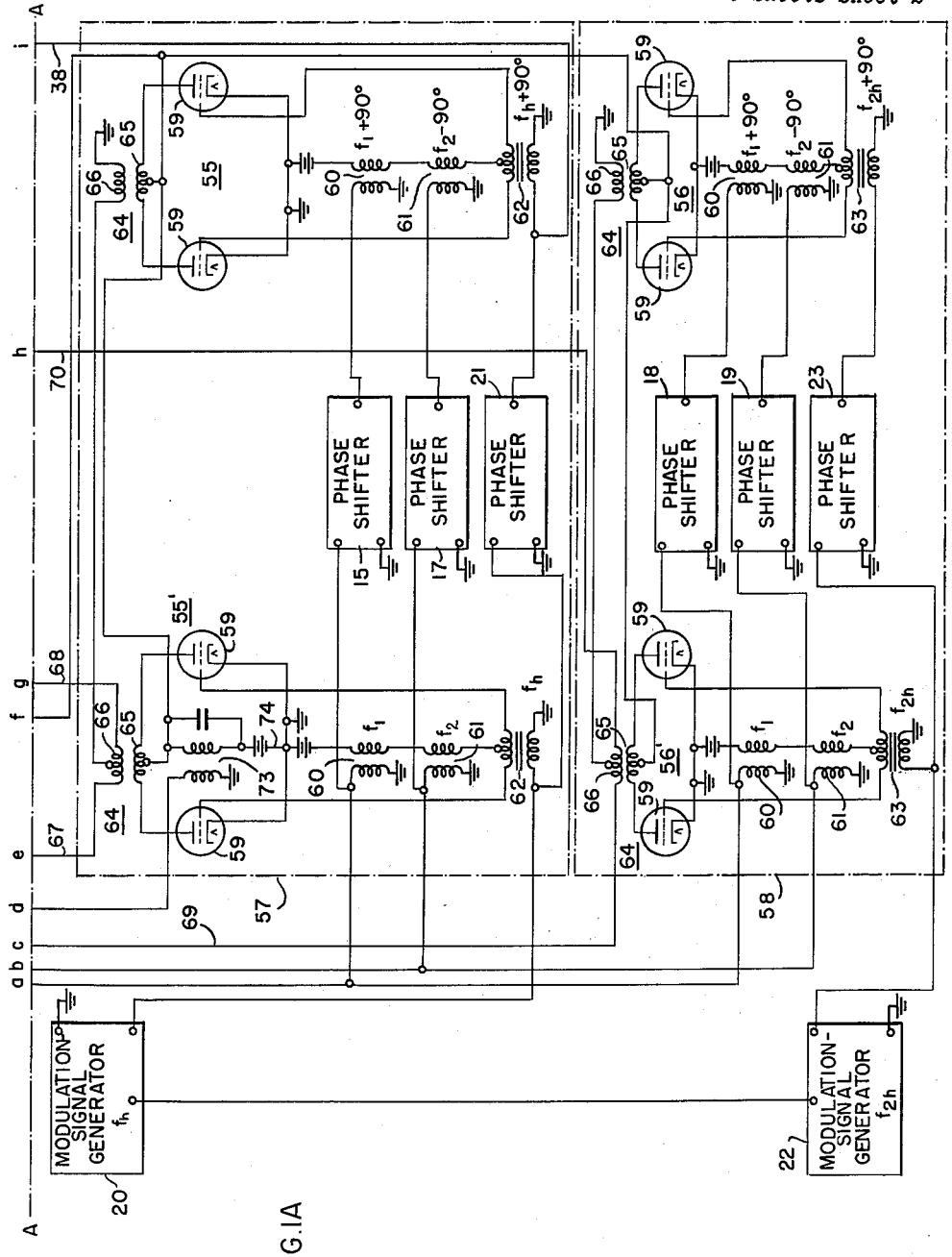

Referring now to the drawings, Figs. 1 and 1A represent, partly schematically, when placed in adjoining relationship along their respective broken lines A—A and with the corresponding circuits a–i, inclusive, in alignment a complete system for locating a radiant-signal reflector embodying the invention in a particular form; and Fig. 2 represents, also partly schematically, a complete locating system embodying the present invention in a modified form.

Referring now more particularly to Figs. 1 and 1A of the drawings, the system for locating a radiant-signal reflector there represented comprises a plurality of spaced, directive, signal translators or antennas 10, 11, 11', 12, and 12'. These antennas are preferably linearly aligned and equally spaced. The directivity may be increased by the provision of directive elements, such as reflectors 13, 13 of suitable length and of suitable spacing from the antennas. For the particular embodiment represented in Fig. 1, an odd number of antennas are employed and these have a spacing which is determined by the size of the desired sector or angle to be scanned. The spacing is one wave length of the mean frequency of the wave signals applied to the antennas for a scanning sector slightly less than 60 degrees.

The locating system also includes means for providing at least two carrier-frequency wave signals having a substantially quadrature phase relationship and having a first frequency during alternate spaced intervals and a second frequency during intervening intervals. This means comprises a carrier-frequency wave-signal generator 14 and a conventional 90-degree phase shifter 15 which are operative during the aforesaid alternate or transmitting intervals, and comprises a second carrier-frequency wave-signal generator 16 and another 90-degree phase shifter 17 which are operative during the aforesaid intervening or receiving intervals. The output circuit of the generator 14 is coupled to the input circuit of the phase shifter 15 and the output circuit of the generator 16 is coupled to the input circuit of the phase shifter 17. The means further comprises the above-mentioned generators 14 and 16 and also a second pair of 90-degree phase shifters 18 and 19 which are coupled to the respective generators 14 and 16.

A control unit 25 is coupled to both of the generators 14 and 16 for controlling the operation thereof during the above-mentioned transmitting and receiving intervals. The unit 25 is of the type which generates periodic voltage pulses that are effective to place the generator 14 in an operative condition and simultaneously to render the generator 16 inoperative during transmitting intervals. However, during the receiving intervals the unit 25 renders the generator 14 inoperative and the generator 16 operative. The controlling action of the unit 25 is such that the generators 14 and 16 develop pulse-modulated carrier-frequency wave signals at a high repetition rate.

The locating system further includes means for providing two modulation signals having a substantially quadrature phase relationship and having a frequency related to the desired frequency of scanning of the above-mentioned predetermined space by the radiant-signal beam. This scanning frequency is preferably much less than the operating frequency of the unit 25 which controls the operation of the generators 14 and 16. One of these last-mentioned means comprises a low-frequency modulation-signal generator 20 and a 90-degree phase shifter 21 which is coupled to the output circuit thereof. The generator 20 preferably has a frequency equal to the frequency of scanning by the radiant-signal beam. Another of the last-mentioned means comprises a modulation-signal generator 22, which develops a signal having a frequency equal to twice the frequency of scanning, and a quadrature phase shifter 23 which is coupled to the output circuit of the generator 22. The generators 20 and 22 are closely synchronized in operation by suitable means such as mutual coupling.

The locating system also includes a wave-signal receiver of the superheterodyne type. This receiver includes a plurality of heterodyne modulators 30, 31, 31', 32, and 32' coupled to individual ones of the respective antennas 10, 11, 11', 12, and 12' through conventional duplexers 40, 41, 41', 42, and 42'. These duplexers may be of the type disclosed in United States Letters Patent No. 2,415,318, granted February 4, 1947, to Harold A. Wheeler, entitled "Wave-Signal Receiver Arrangement," and assigned to the same assignee as the present invention. Output circuits of the heterodyne modulators are coupled to an intermediate-frequency amplifier 33 through individual intermediate-frequency amplifiers 50, 51, 51', 52, and 52' and the output circuit of the amplifier 33 is coupled to the control electrode and cathode of a conventional cathode-ray tube 34 through a detector and video-frequency amplifier 35. The cathode-ray tube 34 is energized in conventional manner, but a negative bias is applied to its control electrode normally to maintain the tube in the condition of anode-current cutoff except when a signal is applied thereto from the unit 35. The cathode-ray tube 34 is provided with a pair of horizontal deflecting electrodes 36, 36 which are supplied with saw-tooth sweep potentials from a horizontal sweep generator 37. In order that the horizontal trace of the tube 34 as thus operated may provide indications of the angular direction of a wave-signal reflector with respect to the axis of alignment of the antennas 10, 11, 11', 12, and 12', synchronizing signals for controlling the operation of the generator 37 are supplied to the input circuit thereof from the phase shifter 21 through a conductor 38. The tube 34 is also provided with vertical deflecting electrodes 39, 39 which are supplied with saw-tooth sweep potentials from a vertical sweep generator 44. As will presently become more fully apparent, the vertical trace of the tube 34 may be calibrated in units of distance of a wave-signal reflector from the locating system.

The locating system further includes modulator means jointly responsive to the signals developed by the generators 14, 16, 20, and 22 and the phase shifters associated therewith for deriving and applying to the antennas mentioned above, during transmitting intervals, individual ones of a plurality of wave-signal modulation components of individual different frequencies, and for deriving and applying to the above-mentioned heterodyne modulators during receiving intervals individual ones of the aforesaid plurality of wave-signal modulation components but of individual frequencies different from each other and from the first-mentioned components. This is to permit the system angularly to scan a predetermined space with a pulse-modulated radiant-signal beam. It also permits radiant-signal energy of the beam reflected by any radiant-signal reflector, such as an aircraft, in the aforesaid space to the receiving translators to produce in the heterodyne modulators modulation components having additive phase only for one direction of reception by the receiving translators, which direction scans the predetermined space effectively in synchronism with the radiant-signal beam. This modulator means is of the suppressed carrier type and is responsive to wave signals and modulation signals of predetermined related amplitudes and having the parameters thereof so selected and output circuits so coupled to each other that at least two wave-signal modulation components of different frequencies are derived by the modulator means. This modulator means comprises two pairs of conventional balanced modulators 55, 55' and 56, 56' which form the modulator systems 57 and 58. These balanced modulators are generally similar in construction and each includes a pair of electron tubes 59, 59. The carrier-frequency wave signal from the generator 14 is applied through transformers 60, 60 in the same polarity to the input circuits of the modulator tubes of each modulator stage. In particular, this wave signal is applied directly to the modulators 55' and 56' and through the phase shifters 15 and 18 to the respective modulators 55 and 56. Likewise, the carrier-frequency signal from the generator 16 is applied through transformers 61, 61 in the same polarity to the input circuits of the modulator tubes of each modulator stage, directly in the case of the modulators 55' and 56' and through the phase shifters 17 and 19 to the respective modulators 55 and 56. The modulation signal from the generator 20 is applied through a transformer 62 differentially or in push-pull to the input circuits of the modulator tubes of modulators 55' and 55, the signal being applied directly to the modulator 55' and through the phase shifter 21 to the modulator 55. Likewise, the modulation signal from the generator 22 is similarly applied to the tubes of unit 58 through transformers 63, 63 and the phase shifter 23.

Each of the modulators includes an output transformer 64, the primary winding 65 of which is connected in push-pull relation to the anodes of the tubes 59, 59 thereof. The primary windings of the transformers 64 are center-tapped and are coupled together. The secondary windings 66, 66 of the transformers 64, 64 of the modulating system 57 have their relative numbers of turns so proportioned and are so coupled to each other in a common output circuit that at least two wave-signal modulation side-band frequency components are derived, in a manner to be explained subsequently, in the common output circuit of the modulators 55 and 55'. To this end, the secondary winding of the transformer 64 of the modulator 55' is center-tapped and so wound as to develop twice the voltage developed across the corresponding winding of the transformer 64 of the modulator 55. Furthermore, these secondary windings are so poled and interconnected by way of the center tap just mentioned that the voltage developed across the left half of the secondary winding of the transformer 64 of the unit 55' adds to that developed across the secondary winding of the corresponding transformer of the modulator 55. Also, the voltage developed across the right half of the secondary winding of the transformer 64 of the modulator 55' subtracts from that produced across the secondary winding of the transformer 64 of the modulator 55. The secondary windings of the transformers 64, 64 of the modulators 56' and 56 are similarly proportioned and connected. A conductor 67 couples one output terminal of the secondary winding 66 of modulator 55' to the duplexer 41' and another conductor 68 couples the other output terminal thereof to the duplexer 41. Conductors 69 and 70 couple corresponding terminals of the secondary winding 66 of the modulator 56' to the respective duplexers 42' and 42.

The locating system also includes means for applying high-power energization to each of the described modulators during transmitting intervals of operation thereof and means for providing low-power energization therefor during receiving intervals. The first-mentioned means comprises a pulse modulator 72, the input circuit of which is coupled to the control unit 25 and the output circuit of which is coupled to the primary winding of a transformer 73. The secondary winding of the transformer 73 is coupled between the center tap of the primary winding of one of the transformers 64 and ground through a source of potential, such as a battery 74. As will be made clear hereinafter, the battery 74 supplies low-power energization for each of the modulators during the receiving intervals of the system.

An amplifier 75 includes an electron tube 76 which has an input circuit coupled by means of transformers 77 and 78 to the respective output circuits of the carrier-frequency wave-signal generators 14 and 16. An output transformer 79 and a conductor 80 couple the anode circuit of the tube 76 to the duplexer 40. The primary winding of the transformer 79 couples the anode of the tube 76 to the center tap of the primary winding of a transformer 64. The input circuit of the vertical sweep generator 44 is also coupled to the center tap of the primary winding of a transformer 64 through an attenuator 81 so that a vertical linear sweep from the bottom to the top of the screen of the cathode-ray tube 34 may occur at the pulse-repetition rate of the pulse modulator 72.

The cathode-ray tube 34, which utilizes the additive-phase modulation components derived by the receiver in a manner to be explained subsequently, provides an indication of the range of the reflecting object in space along the vertical axis of the cathode-ray tube screen and an indication of azimuth or direction along the horizontal axis thereof. The horizontal deflection of the cathode-ray tube is preferably calibrated in terms of azimuth over the limits of the useful sector being scanned, namely, a 60-degree sector for the antenna spacing mentioned above. Zero azimuth is conveniently selected as normal to the axis of the antenna array. The vertical deflection may similarly be calibrated in terms of distance to a reflecting object.

Considering now the operation of the locating system just described, the control unit 25 develops periodic control-voltage pulses at a high-repetition rate which are effective to establish the transmitting and receiving intervals of the system. To promote an understanding thereof, the operation will be first considered with reference to an alternate or transmitting interval and the next succeeding interval. During each transmitting interval, the generator 16 is rendered inoperative while the generator 14 is rendered operative by control-voltage pulses applied thereto from the unit 25. The generator 14 generates a carrier-frequency wave signal $E \cos \omega t$, or in the simpler notation indicated on Fig. 1 of the drawings, the signal of frequency $f_1$. The control unit 25, during each transmitting interval, also causes the pulse modulator 72 to generate and apply through the transformer 73 a voltage pulse of large value which is applied to both modulator tubes of all of the modulators 55, 55', 56, and 56' and also to the anode of the tube 76 in the radio-frequency amplifier 75. The latter amplifies the carrier-frequency wave signal $f_1$ and applies it through the duplexer 40 to the antenna 10 for radiation thereby. The carrier-frequency signal $f_1$ from the generator 14 is also applied through individual ones of the transformers 60 to the input circuits of the modulators 55, 55', 56, and 56'. The phase shifters 15 and 18 afford a 90-degree phase shift to the signal translated thereby as noted on Fig. 1A of the drawings. The generators 20 and 22 continuously and differentially apply the modulation signals thereof to the input circuits of the modulators of the respective systems 57 and 58 through the transformers 62 and 63. The phase shifters 21 and 23 likewise provide a 90-degree phase shift to the modulation signals translated thereby.

In a well-known manner, each of the modulators 55, 55', 56, and 56' is responsive to the individual carrier-frequency and modulation signals applied thereto to develop in its output circuit a modulated carrier signal. Further, and for reasons well known, each is effective to suppress the carrier-frequency component of this modulated signal while translating the upper side-band and the lower sideband modulation components. It may be shown that the modulator 55′ supplies to the secondary winding of its transformer 64 an instantaneous voltage $e_a$ which is expressed by the relation:

$$e_a = E_{11} \cos(\omega_1 - \omega_h)t - E_{11} \cos(\omega_1 + \omega_h)t \quad (1)$$

where $E_{11}$=the maximum amplitude of the wave-signal voltage applied to the antennas 11 or 11′
$\omega_1 = 2\pi f_1$=the angular frequency of the carrier signal generated by the generator 14, and
$\omega_h = 2\pi f_h$=the angular frequency of the modulation signal generated by the generator 20

It can be similarly shown that the modulator 55 supplies to the secondary winding of its transformer 64 a voltage $e_b$ which may be expressed by the relation:

$$e_b = \tfrac{1}{2} E_{11} \cos(\omega_1 - \omega_h)t + \tfrac{1}{2} E_{11} \cos(\omega + \omega_h)t \quad (2)$$

Because of the previously described connection of the secondary windings of the output transformers of the modulators 55′ and 55, the sum of these voltages between ground and the conductor 67 has the value:

$$e_{67} = E_{11} \cos(\omega_1 - \omega_h)t \quad (3)$$

and this resultant voltage is applied to the antenna 11′ through the conductor 67 and the duplexer 41′. In similar manner, the sum of the voltages between ground and the conductor 68 has the value:

$$e_{68} = E_{11} \cos(\omega_1 + \omega_h)t \quad (4)$$

and is applied to the antenna 11 by means of the conductor 68 and the duplexer 41. Thus, it will be seen that the upper side-band frequency component is applied to the antenna 11 while the lower side-band frequency component is applied to the antenna 11′. Similarly, for a maximum amplitude $E_{12}$ of the wave-signal voltage applied to the antennas 12, 12′ and for an angular frequency $2\omega_h$ of the modulation signal of the generator 22, the upper side-band frequency component:

$$e_{70} = E_{12} \cos(\omega_1 + 2\omega_h)t \quad (5)$$

and the lower side-band frequency component:

$$e_{69} = E_{12} \cos(\omega_1 - 2\omega_h)t \quad (6)$$

are applied to the respective antennas 12 and 12′.

It will be manifest that the frequency difference of the wave-signal modulation components thus applied to any two adjacent antennas is equal to the frequency of the modulation signal produced by the generator 20, which frequency represents the frequency with which the system scans a space area with its radiated-signal beam or with its antenna-system directive characteristic. It will also be apparent that the upper side-band modulation components are applied to those radiators on one side of the central antenna 10, with the components of increasing frequency applied in the order of spacing of corresponding antennas from the latter, while the lower side-band modulation components are applied to those radiators on the opposite side of the central antenna, with the components of decreasing frequency applied in the order of spacing of corresponding antennas from the antenna 10.

When the antenna system is excited with the wave-signal modulation components in the manner described above, the directional radiation characteristic of the antenna system is in the nature of a concentrated radiant-signal beam having a maximum value in a direction which angularly scans through an angle which, by the use of the antenna reflectors 13, is approximately 60 degrees wide. A detailed explanation of radiant-signal beam scanning of this character appears in applicant's above-mentioned United States Letters Patent No. 2,429,726. The radiated beam is the sum of the voltages modified by the spacing and the directivity of the antennas 10, 11, 11′, 12, and 12′ and may be expressed by the equation:

$$e_t = f(D)\left[ E_{10} + 2E_{11} \cos\left(\omega_h t + 2\pi \frac{d}{\lambda} \cos\alpha\right) \right.$$
$$\left. + 2E_{12} \cos 2\left(\omega_h t + 2\pi \frac{d}{\lambda} \cos\alpha\right) \right] \cos\omega_1 t \quad (7)$$

where $f(D)$=a mathematical expression giving the directivity of an antenna element as a function of the angle of radiation in a plane normal to the axis of alignment of such element and its associated reflector and measured from such axis
$E_{10}$=the maximum voltage applied to the antenna 10
$\alpha$=the angle scanned by the system measured relative to the axis of alignment of the antennas
$\lambda$=the wave length of the carrier signal $f_1$
$d$=the spacing between radiators expressed as a fraction of the wave length $\lambda$ It can be shown that Equation 7 is that for a carrier-frequency signal modulated in time and in direction. The direction of scanning by the radiant-signal beam is from the antenna having the wave signal of highest frequency applied thereto to the antenna having the signal of lowest frequency applied thereto when the radiators are energized as indicated. Should the order of the connections of the radiators be reversed from left to right, however, the direction of scanning would also be reversed.

A radiant-signal reflector which is scanned by the radiant-signal beam from the antenna system reflects wave-signal energy. It can be shown that the frequency of this reflected energy is the same as that of the signal applied to the antenna 10. This reflected wave signal is intercepted by the antennas of the antenna system during a succeeding or receiving interval at a time therein related to the round-trip propagation time between the locating system and the reflector in space.

The control unit 25 terminates at the end of the first alternate or transmitting interval both the carrier-frequency signal developed by the generator 14 and the energizing pulse generated by the pulse modulator 72, and at the same time applies a suitable control signal to the generator 16 thereby causing it to generate a carrier-frequency signal expressed by the relation:

$$e_0 = E \cos\omega_2 t \quad (8)$$

or, as more simply expressed, a signal of frequency $f_2$. This carrier-frequency signal is thus generated during the receiving interval and preferably has a frequency lower than that of the signal $f_1$. The signal $f_2$ is applied to the radio-frequency amplifier 75 by the transformer 78 and also is applied by the transformers 61, 61 to the balanced modulators 55, 55′, 56, and 56′. The phase shifters 17 and 19 shift the phase of the signal translated thereby 90 degrees, but in the opposite direction to the phase shift afforded by the units 15 and 18. During the receiving interval, the generators 20 and 22 also supply modulation signals to the several balanced modulators. The carrier-frequency signals developed by the modulator systems 57 and 58 and the radio-frequency amplifier 75 during the receiving interval have a low-power value since the energization supplied by the battery 74 is considerably less than that afforded by the pulse modulator 72 through the transformer 73. The resultant upper side-band and lower side-band modulation components are developed as first described and are applied to individual ones of the heterodyne modulators 30, 31, 31′, 32, and 32′ through the corresponding duplexers. It can readily be shown that the frequencies of the signals applied to the heterodyne modulators have relative values, as indicated on the drawings, which vary from one another in the reverse order to that of the signals applied to the antennas during a transmitting interval. This is to ensure that the directivity characteristic of the antenna system shall scan in the same direction during receiving intervals as the radiated-signal beam scanned during a preceding transmitting interval as is more fully explained in applicant's aforementioned Patent No. 2,426,460. There is also applied through the duplexers to the heterodyne modulators the reflected carrier-frequency signals intercepted by the antenna system. The heterodyne modulators derive the heterodyne difference-frequency signal components and these are selectively amplified in the intermediate-frequency amplifiers 50, 51, 51', 52, and 52'. The signal output of these amplifiers are applied to the combining intermediate-frequency amplifier 33. It can be shown that the resultant intermediate-frequency signal derived during the intervening interval may be expressed by the equation:

$$e_r = f(D)\left[E_{10}' + 2E_{11}' \cos\left(\omega_h t + 2\pi \frac{d}{\lambda} \cos \alpha\right) + 2E_{12}' \cos 2\left(\omega_h t + 2\pi \frac{d}{\lambda} \cos \alpha\right)\right] \cos \omega_3 t$$

(9)

where $\omega_3 = \omega_1 - \omega_2 = 2\pi f_3 t$ and
$f_3$ = the frequency of the intermediate-frequency signal developed in the intermediate-frequency amplifier 33

Thus, it will be seen that the foregoing equation is identical with the Equation 7 for the signal transmitted by the locating system except for the maximum voltage amplitude thereof, which has a relatively low value during the receiving interval, and except for the frequency of the intermediate-frequency signal which is also lower than the signal transmitted during the transmitting interval. It therefore may be said that the modulation components produced in the heterodyne modulators have additive phase for only one direction of reception by the radiators, which direction scans the space in which the reflector is located effectively in synchronism with the transmitted radiant-signal beam.

The signal output of the intermediate-frequency amplifier 33 is detected and amplified in the usual manner by the unit 35 and is applied to the input circuit of the cathode-ray tube 34. The synchronizing signals derived during the preceding alternate interval from the units 72 and 20 control the operation of the horizontal sweep generator 37 and the vertical sweep generator 44 and the sweep potentials produced by generators 37 and 44 so deflect the cathode-ray beam of the cathode-ray tube 34 that the application of a derived reflected signal to the input circuit of the cathode-ray tube produces in the well-known manner an indication of the distance and the direction of the wave-signal reflector in space from the locating system.

While for simplicity the operation has been described generally with reference to alternate transmission intervals and intervening receiving intervals without mentioning the relative durations of these intervals, it will be understood that in practice the alternate transmitting intervals are of relatively short duration (for example, of the order of one microsecond) while the intervening receiving intervals are of relatively much longer duration (for example, 1000 microseconds) so that effectively short pulses of wave-signal energy are radiated at a high-repetition rate during the transmitting intervals and reflected wave-signal energy is received during the longer receiving intervals. The pulsing rate is preferably sufficiently high with relation to the angular scanning frequency of the radiated-signal beam that several wave-signal pulses are radiated as the scanning by the radiant-signal beam progresses through only a small angle. Hence, reflected energy from an object within a maximum predetermined distance in space may be received before the receiving directivity of the system has changed appreciably. Since frequency-responsive devices such as band-pass networks, for selecting predetermined ones of the plurality of closely spaced high-frequency wave signals which are produced when low-scanning frequencies are employed in a scanning system which electrically moves the scanning beam, are difficult to build but are unnecessary in the scanning system just described, the latter is particularly advantageous when the scanning is accomplished at a low rate.

Referring now to Fig. 2 of the drawings, there is represented partly schematically a modification of a radiant-signal locating system which is similar to that represented in Figs. 1 and 1A, corresponding elements being designated by the same reference numerals. The system of Fig. 2 differs from that of Fig. 1 in that the radiating system of Fig. 2 includes an even number of antennas, for example six, instead of the odd number of five shown in Fig. 1. This change from an odd number of antennas to an even number thereof changes somewhat the modulator arrangement in that modulator 75' is now a balanced modulator of the carrier suppressed type and applies upper side-band and lower side-band modulation components to the spaced antennas 10 and 10' through duplexers 40 and 40'. Further, the modulation signals which are applied to the modulator systems 75', 57, 58 by the modulation-signal generators $20_a$, $20_b$, and $20_c$ have frequencies $\tfrac{1}{2}f_h$, $\tfrac{3}{2}f_h$, and $\tfrac{5}{2}f_h$, and are synchronized by a voltage of frequency $f_h$ supplied by the generator 20, for reasons more fully explained in applicant's above-mentioned Patent No. 2,426,460.

The operation of the Fig. 2 locating system is essentially similar to that of the Fig. 1 arrangement, except for the frequencies of the derived and transmitted wave signals, the modulation signals, and the signals applied to the receiver portion of the system. It may be shown that the radiant-signal beam transmitted by the locating system of Fig. 2 may be expressed by the equation:

$$e_t = f(D)\left[2E_{10}\cos\frac{1}{2}\left(\omega_h t + 2\pi\frac{d}{\lambda}\cos\alpha\right) + 2E_{11}\cos\frac{3}{2}\left(\omega_h t + 2\pi\frac{d}{\lambda}\cos\alpha\right) + 2E_{12}\cos\frac{5}{2}\left(\omega_h t + 2\pi\frac{d}{\lambda}\cos\alpha\right)\right]\cos\omega_1 t$$

(10)

It may also be shown that the composite intermediate-frequency signal resulting from the heterodyning of the received reflected wave signal and the signals developed by the modulator systems 75', 57, and 58 during the intervening receiving intervals may be expressed by the equation:

$$e_r = f(D)\left[2E_{10}'\cos\frac{1}{2}\left(\omega_h t + 2\pi\frac{d}{\lambda}\cos\alpha\right) + 2E_{11}'\cos\frac{3}{2}\left(\omega_h t + 2\pi\frac{d}{\lambda}\cos\alpha\right) + 2E_{12}'\cos\frac{5}{2}\left(\omega_h t + 2\pi\frac{d}{\lambda}\cos\alpha\right)\right]\cos\omega_1 t$$

(11)

Both of these equations define a carrier wave which is modulated in time and in direction and are therefore similar in nature to the corresponding Equations 7 and 9 which represent the transmitted and the composite intermediate-frequency signals of the arrangement of Fig. 1.

From the foregoing descriptions of the two embodiments of the invention, it will be apparent that a locating system embodying the present invention is adapted to scan a predetermined space entirely by relatively simple electrical units and without the use of cumbersome rotating mechanical apparatus. The nature of the locating system is such that the scanning may be accomplished with pulse-modulated wave signals and at extremely low-scanning rates. The construction and the arrangement of the balanced modulators employed in the locating system are such that they render unnecessary the use of any expensive system of wave-signal band-pass selectors for deriving wave signals of proper frequency for transmission and reception, thus simplifying the construction of the locating system and materially reducing the cost thereof. Furthermore, the same balanced modulators may be employed for both transmission at a high-power level and for reception with normal low power applied to the receiver of the locating system. It will also be clear from the foregoing description that the same radiating system may be employed for both transmission and reception, thus effecting additional economy.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for scanning a predetermined space with a radiant-signal beam comprising: a plurality of spaced signal radiators; means for providing two carrier-frequency wave signals having a substantially quadrature phase relationship; means for providing two signals having a substantially quadrature phase relationship and having a frequency related to the desired frequency of scanning of said predetermined space by said radiant-signal beam; modulator means responsive to said wave signals and said signals for deriving at least two wave-signal modulation components of different frequencies; and means for applying said derived components to individual ones of said radiators, whereby said system angularly scans said predetermined space with said radiant-signal beam.

2. A system for scanning a predetermined space with a radiant-signal beam comprising: a plurality of spaced signal radiators; means for providing two carrier-frequency wave signals having a substantially quadrature phase relationship; means for providing two modulation signals having a substantially quadrature phase relationship and having a frequency related to the desired frequency of scanning of said predetermined space by said radiant-signal beam; balanced modulator means responsive to said wave signals and said modulation signals for deriving at least two wave-signal modulation components of different frequencies; and means for applying said derived components to individual ones of said radiators, whereby said system angularly scans said predetermined space with said radiant-signal beam.

3. A system for scanning a predetermined space with a radiant-signal beam comprising: a plurality of spaced signal radiators; means for providing two carrier-frequency wave signals having a substantially quadrature phase relationship; means for providing two modulation signals having a substantially quadrature phase relationship and having a frequency related to the desired frequency of scanning of said predetermined space by said radiant-signal beam; modulator means of the suppressed carrier type responsive to said wave signals and said modulation signals for deriving at least two wave-signal modulation side-band frequency components of different frequencies; and means for applying said derived side-band frequency components to individual ones of said radiators, whereby said system angularly scans said predetermined space with said radiant-signal beam.

4. A system for scanning a predetermined space with a radiant-signal beam comprising: a plurality of spaced signal radiators; means for providing a first carrier-frequency wave signal and a second carrier-frequency wave signal having a substantially quadrature phase relationship with respect to said first wave signal; means for providing a first modulation signal and a second modulation signal having a substantially quadrature phase relationship with respect to said first modulation signal, said modulation signals having a frequency related to the desired frequency of scanning of said predetermined space by said radiant-signal beam; balanced modulator means including means for modulating said first wave signal with said first modulation signal and for modulating said second wave signal with said second modulation signal and jointly responsive to both modulated wave signals for deriving at least two wave-signal modulation side-band frequency components of different frequencies; and means for applying said derived side-band frequency components to individual ones of said radiators, whereby said system angularly scans said predetermined space with said radiant-signal beam.

5. A system for scanning a predetermined space with a radiant-signal beam comprising: a plurality of spaced signal radiators; means for providing two carrier-frequency wave signals having a substantially quadrature phase relationship; means for providing two modulation signals having a substantially quadrature phase relationship and having a frequency related to the desired frequency of scanning of said predetermined space by said radiant-signal beam; a pair of modulator means responsive to said wave signals and said modulation signals and including individual output circuits so coupled to each other as to derive at least two wave-signal modulation components of different frequencies; and means for applying said derived components to individual ones of said radiators, whereby said system angularly scans said predetermined space with said radiant-signal beam.

6. A system for scanning a predetermined space with a radiant-signal beam comprising: a plurality of spaced signal radiators; means for providing two carrier-frequency wave signals having a substantially quadrature phase relationship; means for providing two modulation signals having a substantially quadrature phase relationship and having a frequency related to the desired frequency of scanning of said predetermined space by said radiant-signal beam; a pair of modulator means responsive to said wave signals and modulation signals of predetermined related amplitudes and having parameters so selected and output circuits so coupled to each other that said modulator means derives at least two wave-signal modulation components of different frequencies; and means for applying said derived components to individual ones of said radiators, whereby said system angularly scans said predetermined space with said radiant-signal beam.

7. A system for scanning a predetermined space with a radiant-signal beam comprising: an odd number of aligned equally spaced signal radiators; means for providing two carrier-frequency wave signals having a substantially quadrature phase relationship; means for providing two modulation signals having a substantially quadrature phase relationship and having a frequency related to the desired frequency of scanning of said predetermined space by said radiant-signal beam; means for amplifying one of said two wave signals; modulator means responsive to said wave signals and said modulation signals for deriving at least two wave-signal modulation components of different frequencies equally spaced in the frequency spectrum from the frequency of said one wave signal; and means for applying to the center one of said radiators said amplified wave signal and for applying to individual ones of the others of said radiators said derived components with the components of increasing frequency applied in order to said other radiators in the order of the aligned positions of said other radiators from an end radiator thereof, whereby said system angularly scans said predetermined space with said radiant-signal beam.

8. A system for scanning a predetermined space with a radiant-signal beam comprising: a plurality of aligned equally spaced signal radiators; means for providing two carrier-frequency wave signals having a substantially quadrature phase relationship; means for providing two modulation signals having a substantially quadrature phase relationship and having a frequency related to the desired frequency of scanning of said predetermined space by said radiant-signal beam; modulator means of the suppressed carrier type responsive to said wave signals and said modulation signals for deriving upper side-band and lower side-band modulation components; means for applying said upper side-band modulation components individually to those radiators which are positioned on one side of the center point of said radiators with the modulation components of increasing frequency applied in order to the radiators in the order of spacing thereof from said center point; and means for applying the lower side-band modulation components individually to those radiators which are positioned on the other side of said center point with the modulation components of decreasing frequency applied in order to the radiators in the order of spacing thereof from said center point, whereby said system angularly scans said predetermined space with said radiant-signal beam.

9. A system for locating a radiant-signal reflector by scanning a predetermined space with a pulse-modulated radiant-signal beam comprising: a plurality of spaced signal translators; means for providing two carrier-frequency wave signals having a substantially quadrature phase relationship and having a first frequency during alternate spaced intervals and a second frequency during intervening intervals; means for providing two modulation signals having a quadrature phase relationship and having a frequency related to the desired frequency of scanning of said space by said radiant-signal beam; a wave-signal receiver including a plurality of heterodyne modulators coupled to individual ones of a plurality of spaced receiving translators; modulator means jointly responsive to said wave signals and said modulation signals for deriving and applying to said first-mentioned translators during said alternate intervals individual ones of a plurality of wave-signal modulation components of individual different frequencies and for deriving and applying to said heterodyne modulators during said intervening intervals individual ones of a plurality of wave-signal modulation components of individual frequencies different from each other and from said first-mentioned components, whereby said system angularly scans said predetermined space with a pulse-modulated radiant-signal beam and radiant-signal energy of said beam reflected by any radiant-signal reflector in said predetermined space to said receiving translators produces in said heterodyne modulators modulation components having additive phase only for one direction of reception by said receiving translators which direction scans said predetermined space effectively in synchronism with said radiant-signal beam; and means for utilizing said additive-phase modulation components to provide an indication of at least the direction of said reflector with respect to said system.

10. A system for locating a radiant-signal reflector by scanning a predetermined space with a pulse-modulated radiant-signal beam comprising: a plurality of spaced signal translators; means for providing two carrier-frequency wave signals having a substantially quadrature phase relationship and having a first frequency during alternate spaced intervals and a second frequency during intervening intervals; means for providing two modulation signals having a quadrature phase relationship and having a frequency related to the desired frequency of scanning of said space by said radiant-signal beam; a wave-signal receiver including a plurality of heterodyne modulators coupled to individual ones of a plurality of said translators; modulator means jointly responsive to said wave signals and said modulation signals for deriving and applying to said translators during said alternate intervals individual ones of a plurality of wave-signal modulation components of individual different frequencies and for deriving and applying to said heterodyne modulators during said intervening intervals individual ones of a plurality of wave-signal modulation components of individual frequencies different from each other and from said first-mentioned components, whereby said system angularly scans said predetermined space with a pulse-modulated radiant-signal beam and radiant-signal energy of said beam reflected by any radiant-signal reflector in said predetermined space to said translators produces in said heterodyne modulators modulation components having additive phase only for one direction of reception by the receiving ones of said translators which direction scans said predetermined space effectively in synchronism with said radiant-signal beam; and means for utilizing said additive-phase modulation components to provide an indication of at least the direction of said reflector with respect to said system.

11. A system for locating a radiant-signal reflector by scanning a predetermined space with a pulse-modulated radiant-signal beam comprising: a plurality of spaced signal translators; means for providing two carrier-frequency wave signals having a substantially quadrature phase relationship and having a first frequency during alternate spaced intervals and a second frequency during intervening intervals; means for providing two modulation signals having a quadrature phase relationship and having a frequency related to the desired frequency of scanning of said space by said radiant-signal beam; a wave-signal receiver including a plurality of heterodyne modulators coupled to individual ones of a plurality of spaced receiving translators; modulator means, including means for providing high-power energization therefor during said alternate intervals and means for providing low-power energization therefor during said intervening intervals, jointly responsive to said wave signals and said modulation signals for deriving and applying to said first-mentioned translators during said alternate intervals individual ones of a plurality of wave-signal modulation components of individual different frequencies and for deriving and applying to said heterodyne modulators during said intervening intervals individual ones of a plurality of wave-signal modulation components of individual frequencies different from each other and from said first-mentioned components, whereby said system angularly scans said predetermined space with a high-power pulse-modulated radiant-signal beam and radiant-signal energy of said beam reflected by any radiant-signal reflector in said predetermined space to said receiving translators produces in said heterodyne modulators modulation components having additive phase only for one direction of reception by said receiving translators which direction scans said predetermined space effectively in synchronism with said radiant-signal beam; and means for utilizing said additive-phase modulation components to provide an indication of at least the direction of said reflector with respect to said system.

12. A system for locating a radiant-signal reflector by scanning a predetermined space with a pulse-modulated radiant-signal beam comprising: a plurality of spaced signal translators; means for providing two carrier-frequency wave signals having a substantially quadrature phase relationship and having a first frequency during alternate spaced intervals and a second frequency during intervening intervals; means for providing two modulation signals having a quadrature phase relationship and having a frequency related to the desired frequency of scanning of said space by said radiant-signal beam; a wave-signal receiver including a plurality of heterodyne modulators coupled to individual ones of a plurality of spaced receiving translators; modulator means jointly responsive to said wave signals and said modulation signals for deriving and applying to said first-mentioned translators during said alternate intervals individual ones of a plurality of wave-signal modulation components of individual different frequencies and for deriving and applying to said heterodyne modulators during said intervening intervals individual ones of a plurality of wave-signal modulation components of individual frequencies different from each other and from said first-mentioned components, whereby said system angularly scans said predetermined space with a pulse-modulated radiant-signal beam and radiant-signal energy of said beam reflected by any radiant-signal reflector in said predetermined space to said receiving translators produces in said heterodyne modulators modulation components having additive phase only for one direction of reception by said receiving translators which direction scans said predetermined space effectively in synchronism with said radiant-signal beam; and means responsive to the operation of said second-mentioned means and said modulator means for utilizing said additive-phase modulation components to provide an indication of the distance and the direction of said reflector with respect to said system.

13. A system for locating a radiant-signal reflector by scanning a predetermined space with a pulse-modulated radiant-signal beam comprising: a plurality of spaced signal translators; means for providing two carrier-frequency wave signals having a substantially quadrature phase relationship and having a first frequency during alternate spaced intervals and a second frequency during intervening intervals; means for providing two modulation signals having a quadrature phase relationship and having a frequency related to the desired frequency of scanning of said space by said radiant-signal beam; a wave-signal receiver including a plurality of heterodyne modulators coupled to individual ones of a plurality of spaced receiving translators; modulator means, including modulators of the suppressed carrier type, jointly responsive to said wave signals and said modulation signals for deriving and applying to said first-mentioned translators during said alternate intervals individual ones of a plurality of wave-signal modulation side-band frequency components and for deriving and applying to said heterodyne modulators during said intervening intervals individual ones of a plurality of wave-signal modulation side-band frequency components of individual frequencies different from said first-mentioned components, whereby said system angularly scans said predetermined space with a pulse-modulated radiant-signal beam and radiant-signal energy of said beam reflected by any radiant-signal reflector in said predetermined space to said receiving translators produces in said heterodyne modulators modulation components having additive phase only for one direction of reception by said receiving translators which direction scans said predetermined space effectively in synchronism with said radiant-signal beam; and means for utilizing said additive-phase modulation components to provide an indication of at least the direction of said reflector with respect to said system.

References Cited in the file of this patent

UNITED STATES PATENTS

| | | |
|---|---|---|
| 1,922,677 | Greig | Aug. 15, 1933 |
| 1,988,006 | Greig | Jan. 15, 1935 |
| 2,129,004 | Greig | Sept. 6, 1938 |
| 2,252,699 | Byrne | Aug. 19, 1941 |
| 2,377,902 | Relson | June 12, 1945 |
| 2,418,156 | Bollman | Apr. 1, 1947 |
| 2,426,460 | Lewis | Aug. 26, 1947 |
| 2,435,615 | Varian | Feb. 10, 1948 |
| 2,437,281 | Tawney | Mar. 9, 1948 |
| 2,445,213 | Evans | July 13, 1948 |